United States Patent
Murphy et al.

(10) Patent No.: US 7,142,737 B1
(45) Date of Patent: Nov. 28, 2006

(54) INTRUSION DETECTION SYSTEM FOR USE ON SINGLE MODE OPTICAL FIBER USING A STORAGE REGISTER FOR DATA

(75) Inventors: Cary R. Murphy, Hickory, NC (US); David E. Vokey, Sydney (CA); Mark K. Bridges, Hickory, NC (US)

(73) Assignee: Network Integrity Systems Inc., Conover, NC (US)

( * ) Notice: Subject to any disclaimer, the term of this patent is extended or adjusted under 35 U.S.C. 154(b) by 0 days.

(21) Appl. No.: 11/152,772

(22) Filed: Jun. 15, 2005

Related U.S. Application Data

(60) Provisional application No. 60/643,001, filed on Jan. 12, 2005, provisional application No. 60/643,002, filed on Jan. 12, 2005, provisional application No. 60/643,003, filed on Jan. 12, 2005, provisional application No. 60/643,004, filed on Jan. 12, 2005.

(51) Int. Cl.
| | | |
|---|---|---|
| *G02B 6/00* | (2006.01) | |
| *G02B 6/27* | (2006.01) | |
| *G08B 13/00* | (2006.01) | |
| *G08B 13/24* | (2006.01) | |

(52) U.S. Cl. .................. 385/13; 340/541; 340/555; 385/11; 385/12

(58) Field of Classification Search ............ 385/13; 340/541, 555
See application file for complete search history.

(56) References Cited

U.S. PATENT DOCUMENTS

| | | | |
|---|---|---|---|
| 4,840,481 A | | 6/1989 | Spillman, Jr. |
| 4,904,863 A | | 2/1990 | McDearmon |
| 5,026,141 A | * | 6/1991 | Griffiths ............... 385/13 |
| 5,182,779 A | * | 1/1993 | D'Agostino et al. ......... 385/13 |
| 5,384,635 A | | 1/1995 | Cohen et al. |
| 5,462,244 A | * | 10/1995 | Van Der Hoek et al. ............ 246/122 R |
| 6,380,534 B1 | * | 4/2002 | Farhadiroushan et al. .............. 250/227.14 |
| 6,522,797 B1 | * | 2/2003 | Siems et al. ............... 385/12 |
| 6,724,469 B1 | * | 4/2004 | Leblanc .................. 356/73.1 |
| 6,946,646 B1 | * | 9/2005 | Chen et al. ........... 250/227.17 |
| 7,042,369 B1 | * | 5/2006 | Hill et al. ................... 340/942 |
| 2001/0024162 A1 | * | 9/2001 | Lee ........................ 340/555 |
| 2002/0130776 A1 | * | 9/2002 | Houde .................... 340/541 |
| 2005/0002017 A1 | | 1/2005 | Haran |
| 2006/0002650 A1 | * | 1/2006 | Vokey et al. .............. 385/12 |

FOREIGN PATENT DOCUMENTS

| | | |
|---|---|---|
| WO | WO 02/095349 | 11/2002 |

\* cited by examiner

*Primary Examiner*—John D. Lee
*Assistant Examiner*—Rhonda S. Peace
(74) *Attorney, Agent, or Firm*—Adrian D. Battison; Michael R. Williams; Ryan W. Dupuis

(57) ABSTRACT

A telecommunications optical fiber is secured against intrusion by detecting manipulation of the optical fiber prior to an intrusion event. This can be used in a non-locating system where the detection end is opposite the transmit end or in a locating system which uses Fresnel reflections and Rayleigh backscattering to the transmit end to detect and then locate the motion. The Rayleigh backscattering time sliced data can be stored in a register until an intrusion event is detected. The detection is carried out by a polarization detection system which includes an optical splitter which is manufactured in simplified form for economic construction. This uses a non-calibrated splitter and less than all four of the Stokes parameters. It can use a polarimeter type function limited to linear and circular polarization or two linear polarizers at 90 degrees.

20 Claims, 10 Drawing Sheets

INTRUSION DETECTION SYSTEM FOR USE ON SINGLE MODE OPTICAL FIBER USING A STORAGE REGISTER FOR DATA

RELATED APPLICATIONS

This application claims priority under 35 U.S.C.119 from Provisional Applications 60/643,001, 60/643,002, 60/643,003 and 60/643,004 all filed Jan. 12$^{th}$ 2005.

Reference is made to co-pending applications filed on the same date as this application by the same inventors, the disclosures of which are incorporated herein by reference as follows:

Application Ser. No. 11/152,679 entitled AN INTRUSION DETECTION SYSTEM FOR USE ON SINGLE MODE OPTICAL FIBER USING FRESNEL REFLECTIONS.

Application Ser. No. 11/152,681 entitled AN INTRUSION DETECTION SYSTEM FOR USE ON SINGLE MODE OPTICAL FIBER USING A POLARIMETER.

Application Ser. No. 11/152,680 entitled AN INTRUSION DETECTION SYSTEM FOR USE ON SINGLE MODE OPTICAL FIBER USING A SIMPLIFIED POLARIMETER.

Application Ser. No. 11/152,663 entitled AN INTRUSION DETECTION SYSTEM FOR USE ON SINGLE MODE OPTICAL FIBER USING A COST REDUCED POLARIMETER.

Application Ser. No. 11/152,768 entitled AN INTRUSION DETECTION SYSTEM FOR USE ON SINGLE MODE OPTICAL FIBER USING POLARIZERS AT 90 DEGREES.

FIELD OF THE INVENTION

The present invention relates to the detection of movement of a single mode optical fiber.

The present invention as described in more detail hereinafter includes both to embodiments of the invention which allow location of the intrusion event by analysis at the same end as the transmitted light of reflected light and to embodiments of the invention which do not provide location of the intrusion event by analysis of light at a remote end of the fiber.

BACKGROUND OF THE INVENTION

Single mode fiber optic backbone cables are being deployed to connect sections of high-speed networks together, and for long distance communications. To secure these high-speed networks, software based Intrusion Detection Systems (IDSs) have been introduced. These systems capture and analyze all packets for unusual patterns that point to an intrusion as well as monitor systems accessing a network. However, this adds to the complexity of the network and burdens processing power. Current IDSs are hampered by Base-Rate Fallacy limitation, which is the inability to suppress false alarms. Additionally, software-based IDSs do not provide protection against passive optical fiber tapping, which can go undetected by the network hardware. Software IDS is the de-facto standard for intrusion detection, however it is oblivious to actual physical layer intrusion and perturbation such as tapping or the attendant fiber handling.

It is well known, by those skilled in the technology, that optical fibers are easily tapped and the data stream monitored. One relatively simple non-interruptive tapping method involves placing a bend coupler on the fiber to be tapped. A controlled bend of a critical radius is placed on the fiber. This causes a small spatial distortion in the core/cladding guiding properties and a fraction of the light escapes the fiber. A detector is located at the point of the light leakage and the data steam observed. Bend couplers typically introduce a loss of light power of up to 1 dB or more. Power measuring intrusion detection systems are available to detect this loss in optical power and provide warning alarms.

With care and skill, more insidious methods are available to the skilled intruder. With a sufficiently sensitive receiver and care in preparation, a fiber can be successfully tapped without introducing a telltale bend in the optical fiber. A successful tap can be achieved by carefully removing a few inches of the protective outer coating of the target fiber and polishing, etching, or otherwise reducing the outer cladding down by a few microns to form a flat coupling region. A cladding-to-cladding coupling is then made using a special intercept fiber. This method intercepts a portion of the weak but measurable evanescent power that propagates along the tapped fiber. In this case, the intercepted light, which is detected by a sensitive receiver, can easily be 20 or 30 dB down from the power in the fiber core. This results in a loss of received optical power of only 0.04 or 0.004 dB and is impossible to detect reliably by power measurement methods. Using a similar stripping mechanism and a high sensitivity photo detector, Rayleigh Scattering from within the fiber can be detected.

Reference is made to Hernday, P. Polarization Measurements. In D. Derickson (Ed.), (1998). *Fiber Optic Test and Measurement* (pp. 220–245). New Jersey: Prentice Hall PTR, the disclosure of which is incorporated herein by reference.

Reference is also made to US pending Application 2005/0002017 published Jan. 6$^{th}$ 2005 by Haran which discloses primarily a method for utilizing an optical fiber for use in detection of intrusion through a perimeter fence but also mentions in passing that similar techniques can be used in optical fibers in transmission systems.

Reference is also made to PCT pending Application WO 02/095349 published Nov. 28$^{th}$ 2002 by Rogers which discloses a method for optical fiber backscatter polarimetry.

In U.S. Pat. No. 5,384,635 (Cohen) published Jan. 24$^{th}$ 1995 is disclosed a method for detecting vibration of an optical fiber caused by digging equipment where the method detects polarization changes in back-scattered light.

In U.S. Pat. No. 4,904,863 (McDearmon) published Feb. 27$^{th}$ 1990 is disclosed a pressure sensor which uses an optical fiber where the method detects polarization changes in back-scattered light.

In U.S. Pat. No. 4,840,481 (Spillman) published Jun. 20$^{th}$ 1989 is disclosed a strain sensor which uses an optical fiber where the method detects polarization changes in back-scattered light.

In U.S. Pat. No. 6,724,469 (LeBlanc) published Apr. 20$^{th}$ 2004 is disclosed a method of polarization optical time-domain reflectometry.

SUMMARY OF THE INVENTION

It is one object of the present invention to provide an arrangement for detecting movement of an optical fiber which overcomes the limitations with power loss detection methods and can detect intrusion activity before any optical power loss occurs.

According to the invention there is provided a method for detecting and locating movement of an optical fiber comprising:

providing a optical fiber having first and second ends;

detecting movement of a portion of the fiber along the length thereof by:

injecting polarized light into the first end of the optical fiber;

detecting at the first end of the fiber a series of received light signals which have been transmitted along the fiber as a result of the injected light pulses such that the received light signals include Raleigh backscattering components from positions along the fiber;

comparing at least some of the received light signals relative to data obtained from previously received ones of the received light signals to detect changes of polarization of the received light signals relative to the previously received light signals;

analyzing the changes in polarization to determine any changes which are indicative of movement of the optical fiber at a portion thereof along the length thereof;

and generating an alarm in response to the detection of any such changes;

and determining the location along the fiber of the said movement by:

detecting polarization of a series of the light signals from the Rayleigh backscattering components in discrete time steps to generate for each time step data relating to the polarization;

storing the data in a register for a period of time and discarding the data after the period of time and replacing it with fresh data;

such that the stored data is time dependent and thus indicative of a time of travel of the light signals and thus of a location of the position from which the Rayleigh backscattering components have originated along the fiber;

and, in the event that movement is detected of the optical fiber, extracting the data from the register and analyzing the polarization of the series of signals to detect the location of the movement.

Preferably the register is a FIFO.

Preferably the changes indicative of movement are detected from Fresnel Reflections.

Preferably where the scattering signal level is typically orders of magnitude lower than the Fresnel Reflections and the Fresnel Reflections are typically infrequent, and wherein the reflections are integrated along with the scattering such that the Fresnel Reflections integrate into a manageable signal and the total integrated signal is monitored for indication of fiber manipulation.

Preferably the scattering signal level is typically orders of magnitude lower than the Fresnel Reflections and the Fresnel Reflections are typically infrequent and wherein the large Fresnel reflections are sampled using a storage technique, this stored sample is compared to other dynamic or stored samples and this comparison is monitored for indication of fiber manipulation.

Preferably the changes in polarization are detected by splitting the received light signals into at least first and second paths and using the first path to detect an amplitude of the light in the path when linearly polarized and using the second path to detect an amplitude of the light in the path when circularly polarized.

Preferably the changes in polarization are detected by splitting the received light signals into only first and second and third paths and using the first path to detect an amplitude of the light in the path when linearly polarized and using the second path to detect an amplitude of the light in the path when circularly polarized and using the third path to detect an amplitude of the light in the path when un-polarized.

Preferably the changes in polarization are detected by splitting the received light signals into only first and second paths and using the first path to detect an amplitude of the light in the path when linearly polarized and using the second path to detect an amplitude of the light in the path when circularly polarized.

Preferably the circularly polarized light in the second path is isolated by a quarter wave retarder and a linear polarizer.

Preferably the light signals are split into the separate paths by a splitter.

Preferably the splitter is selected such that the state of polarization (SOP) of the signals in the separate paths are NOT necessarily maintained relative to an absolute reference as would be required in a standard polarimeter.

Preferably the light signals are split into the separate paths by an optical switch which separates the signals in time division such that the paths are selected sequentially.

Preferably there is provided a second optical switch or a coupler for supplying the signals from the separate paths to a single receiving system for analyzing the amplitude.

Preferably the light in the second path is circularly polarized by a quarter wave retarder and a linear polarizer and wherein the second path is fed back to the optical switch so as to use a single linear polarizer for both the first and second paths.

Preferably an absolute value is obtained of the change in amplitude in each path between a signal and previous signals and the absolute values are summed together to provide an output for analysis.

Preferably an absolute value is obtained of the change in amplitude in each path between a signal and previous signals and the absolute values are summed together to provide an output for analysis.

Preferably an absolute value is obtained of the change in amplitude in each path between a signal and previous signals and the absolute values are summed together to provide an output for analysis.

Preferably the optical fiber is a telecommunications optical fiber including providing for the optical fiber a transmitter of optical pulses at the transmit end and a receiver of the transmitted optical pulses at the receive end such that data can be transmitted along the fiber in a telecommunications system; and wherein the method includes the step of securing the fiber against intrusion by detecting manipulation of the optical fiber causing said movement of a portion thereof along the length thereof and by detecting said movement.

Thus there is provided an intrusion detection system that can sense and alarm any attempt to access the optical fibers in a single mode fiber optic communication cable. The present method monitors the active signal of a single mode optical fiber strand for signal degradation and disturbances in polarization that could indicate fiber damage, handling, or physical intrusion.

The system uses the polarized light output signal from a light source such as, but not limited to, a laser transmitter that is coupled to the single mode fiber; standard semiconductor lasers such as DFB and Fabry-Perot are inherently highly polarized. At the receive end of the link, a detection system determines the state of polarization (SOP) of the light. Mechanical disturbances such as handling of the fiber cable cause shifts in the SOP that is detected by the system and signals a possible intrusion attempt before an actual tap occurs.

Using adaptive filtering, normal background disturbances from environmental heating/cooling systems, road traffic, and background disturbances can be learned and filtered out. This will allow maximum sensitivity to intrusion attempt signatures while minimizing the probability of false alarm events. The design objective is to identify intrusion attempts while the attack is still at the outer layer of the cable structure. This will allow for rapid location and interception of any intruder.

Further claimed is the detection of fiber handling and/or intrusion by method of monitoring state of polarization, degree of polarization, or of other parameters related to SOP and DOP. This includes detection or measurement of the handling or disturbance of the optical fiber or cable, either as a prelude to, incident of, or as a result of an intrusion, as detected by any shift in the degree or state of polarization of any portion of the light contained herein, originating from, or propagating through the optical fiber or cable being monitored.

Further claimed is a means for directing the optical transmission of information into any of a plurality of optical fibers. This could be, but is not limited to an optical switch. Significant to this embodiment is the monitoring of all secondary fibers for intrusion, such as with this invention. The intention is to maintain the security and integrity of all possible fibers from intrusion in order to prevent a preemptive intrusion prior to the re-routing of data.

For illustration, if a perpetrator had unmonitored access to the secondary fiber, a fiber tap could be installed undetected. The primary fiber could then be perturbed, and when data is switched to the secondary, the data security is compromised. According to this invention, when an intrusion is attempted on any fiber, it will be detected; guaranteeing for the future the security of the system.

This summary describes a number of embodiments of this invention:

An embodiment which utilizes only the signals corresponding to S0 and S1, or any other configuration using fewer than the 4 signals required for a full polarimeter. This trade off enables benefits including, but not limited to, a simplified manufacturing process in exchange for impact including, but not limited to, decreased sensitivity.

A secondary embodiment on the above theme utilizing a second optical coupler summing the intrusion and attenuation signals together, by a configurable mix amount. This allows a single optical receiver/detector. The obvious financial advantage of this implementation must be weighed against the extreme sensitivity to interference between the two coherent light paths being combined.

A third embodiment which utilizes a single linear and a single circular polarization sensitive detectors. This does not yield absolute SOP measurements, but will indicate a change in the SOP sufficient for intrusion detection.

BRIEF DESCRIPTION OF THE DRAWINGS

In the following drawings, a first set of embodiments is disclosed in which the detector is at the remote end of the fiber for detection of the intrusion events without locating the events in position along the fiber.

In the following drawings, a second set of embodiments is disclosed in which the detector is at the transmit end of the fiber for detection of the intrusion events while locating the events in position along the fiber by using reflected and backscattered light.

Figure 8:
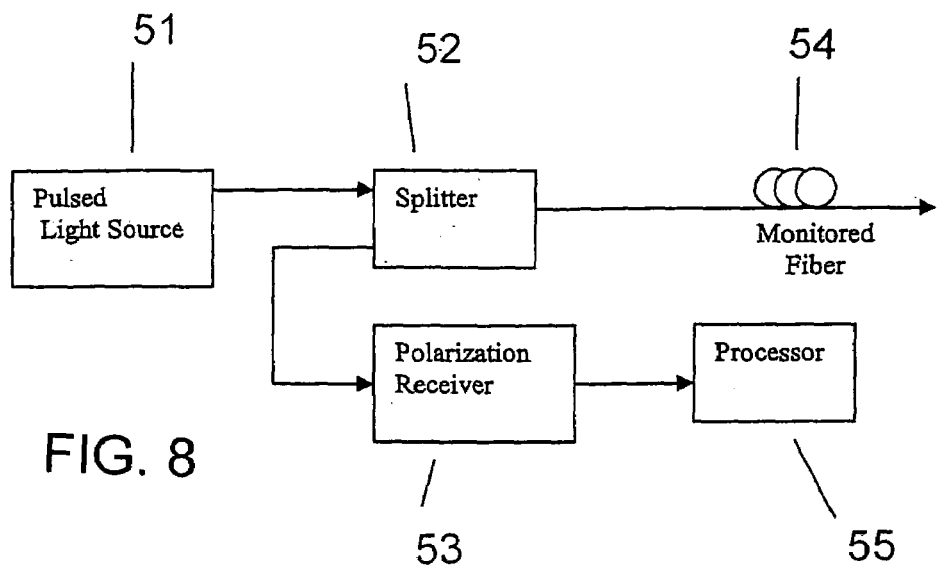

FIG. 8 illustrates a block diagram of a polarimeter used on an optical fiber to detect and locate manipulation of the fiber leading to a potential intrusion event.

Figure 9:
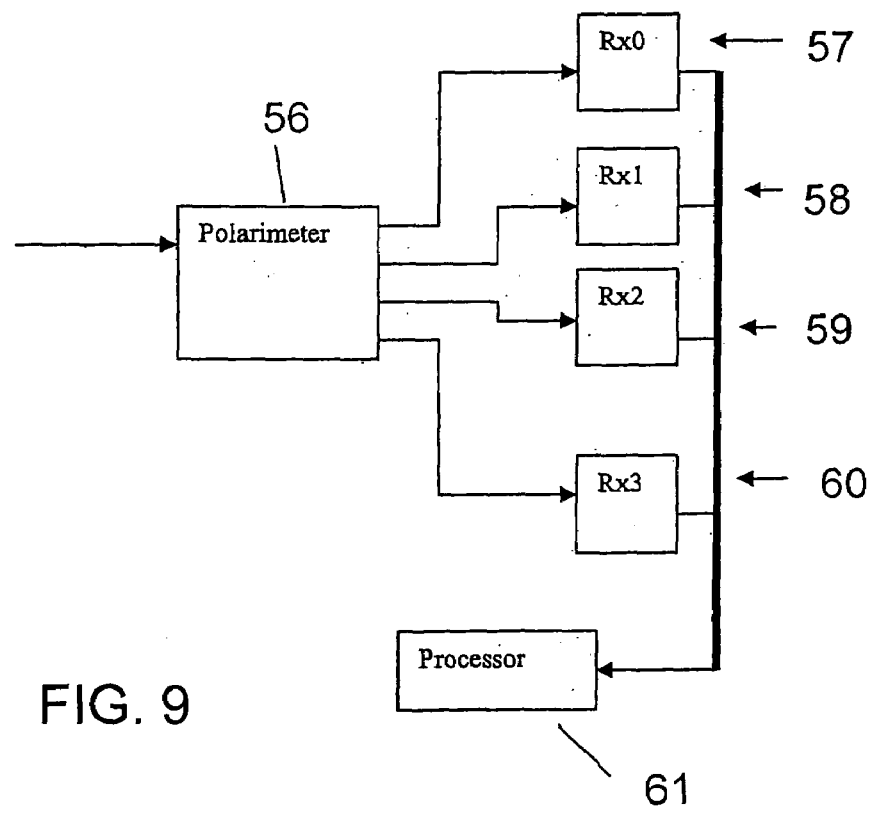

FIG. 9 is a block diagram of the Polarization Receiver from FIG. 8.

Figure 10:
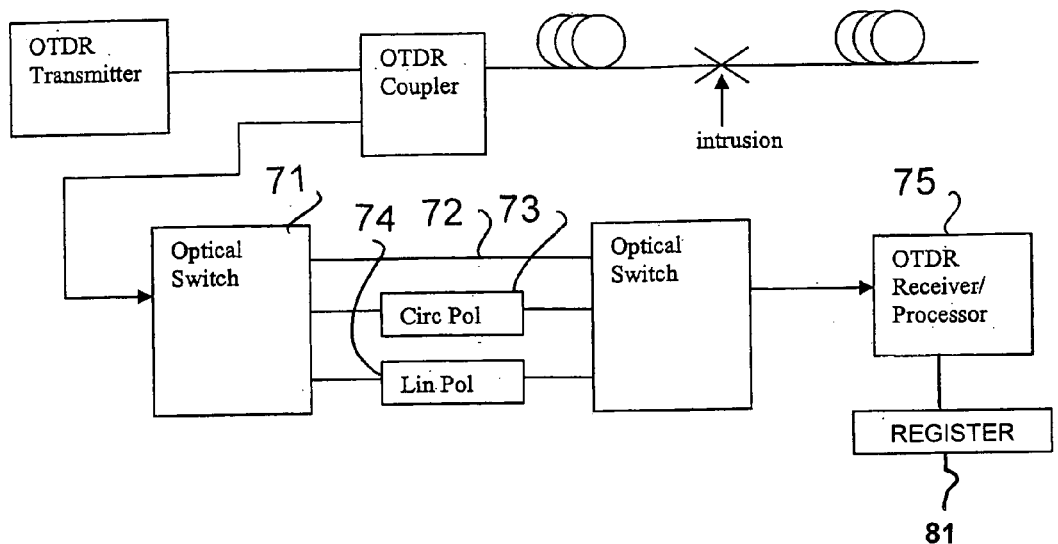

FIG. 10 is a block diagram of a preferred embodiment of detection system using a simplified polarimeter for detection of intrusion events and for locating those intrusion events along the fiber.

Figure 11:
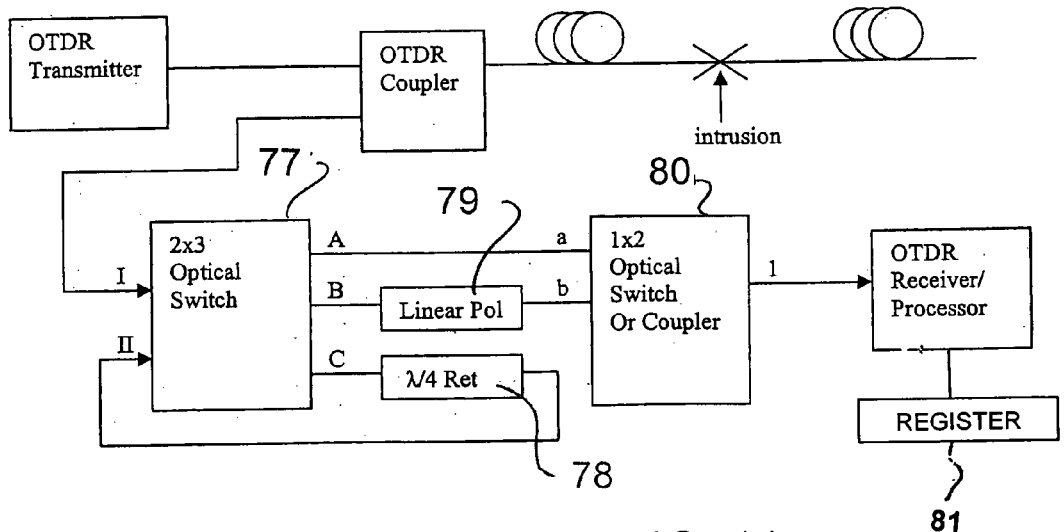

FIG. 11 is a block diagram of an alternative embodiment to that of FIG. 10.

Figure 12:
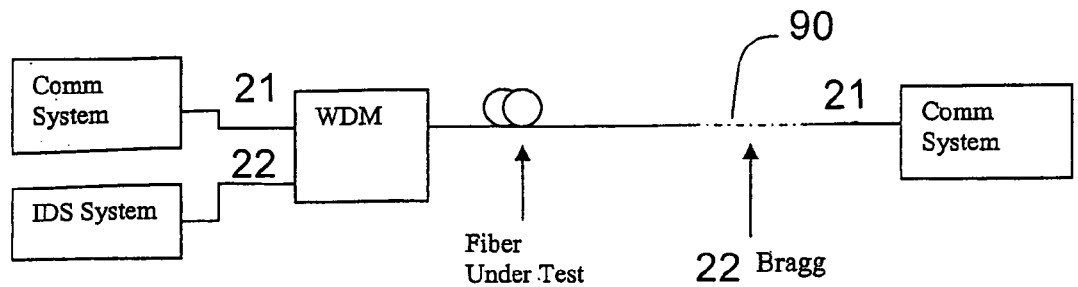
Figure 13:
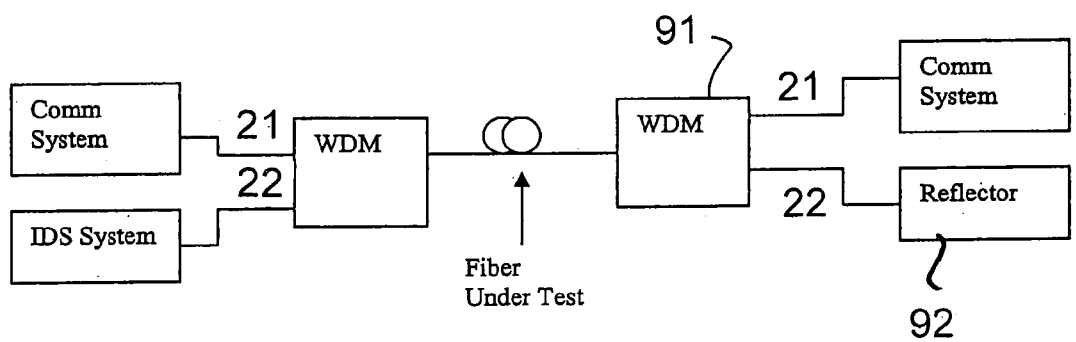
Figure 14:
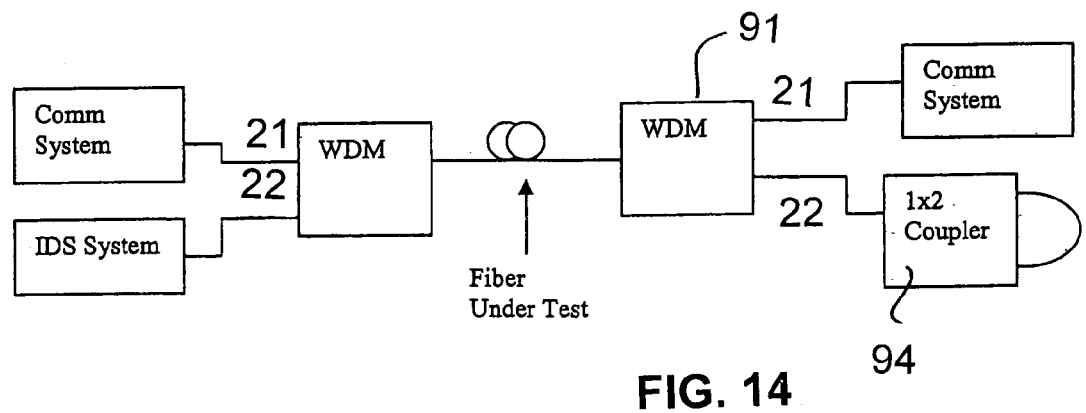

FIGS. 12, 13 and 14 show block diagrams of arrangements in which a wavelength selective reflection can be used, such as a printed Bragg Grating, a reflective connector, or a fiber loop back, as shown respectively for increasing or controlling the level of the Fresnel reflections from the remote end.

Figure 15:
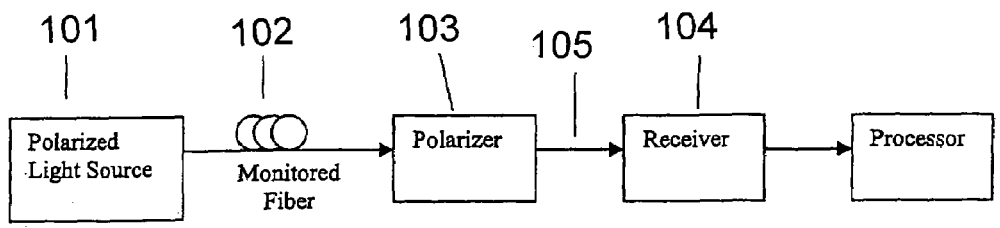

In the following drawings, a third set of embodiments is disclosed in which the detector is at the remote end of the fiber for detection of the intrusion events utilizing two polarizers arranged at 90 degrees:

FIG. 15 illustrates a polarized light source launched into a length of single mode fiber. The single mode fiber is connected to an optical polarizer, which feeds an optical receiver.

Figure 16:
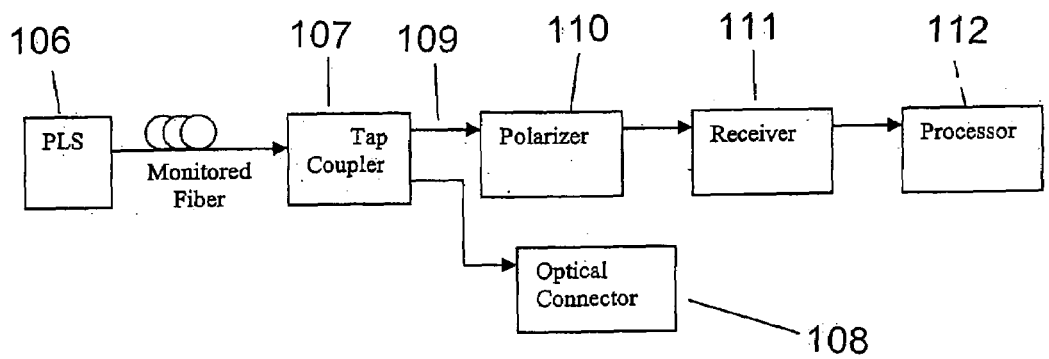

FIG. 16 is a block diagram for an installation in an active fiber which is being used for data. This is similar to FIG. 1 above, with the addition of a fiber optic coupler samples a portion of the signal for analysis, routing the remaining signal to the end user's receiver.

Figure 1:
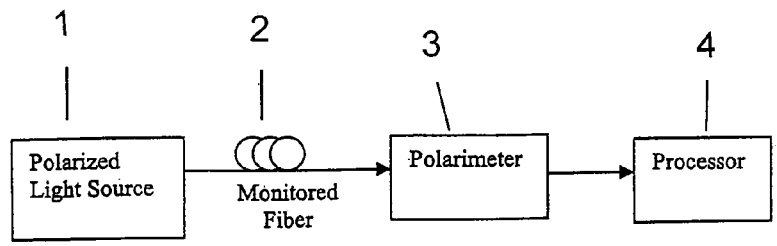
FIG. 1 illustrates a polarized light source launched into a length of single mode fiber. The single mode fiber is connected to an optical polarimeter, which feeds a processor.
Figure 17:
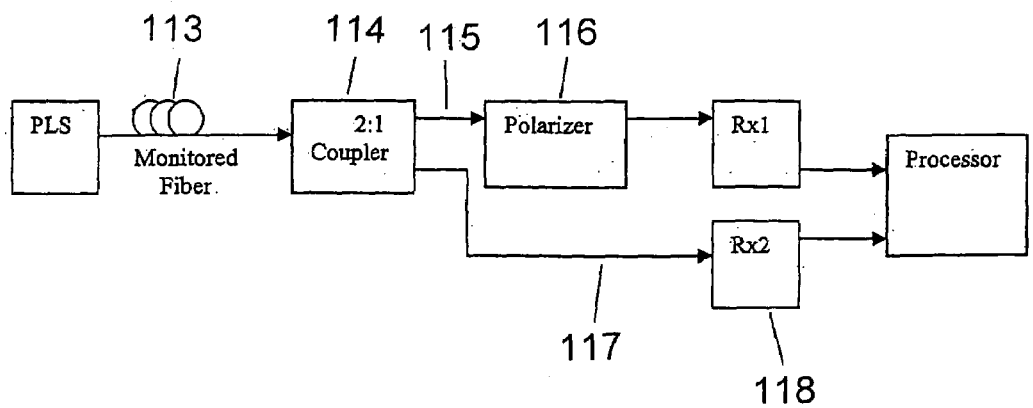

FIG. 17 is similar to FIG. 1 above, with the addition of a 2:1 fiber optic coupler and a second receiver for monitoring the non-intrusion signal.

Figure 18:
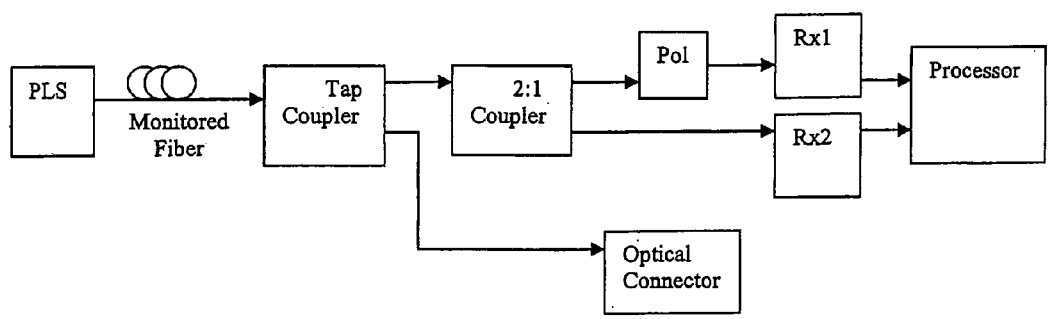

FIG. 18 is a block diagram for a combination of FIGS. 16 and 17 above, the coupler for feeding the end-user equipment, and a dual receiver configuration.

Figure 19:
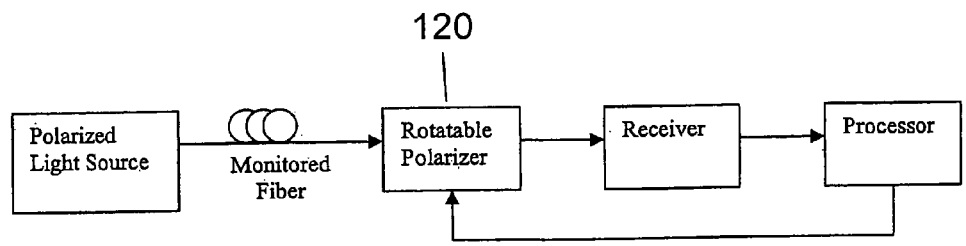

FIG. 19 is a block diagram for a variation on FIG. 1 with the substitution of a rotatable polarizer under a closed feedback loop.

Figure 20:
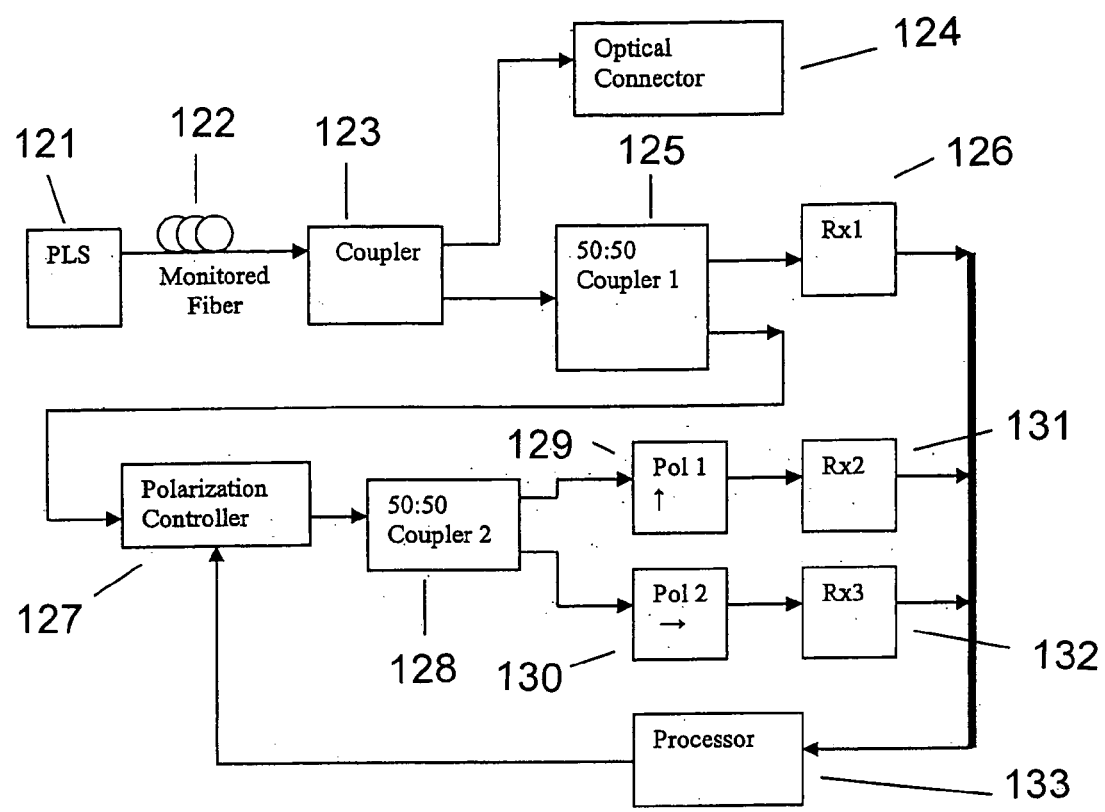

FIG. 20 is a block diagram of one embodiment of the invention.

DETAILED DESCRIPTION

Fundamental to the present invention is the mechanics or more simply by launching a light source of stable polarization 1 into a single mode fiber 2. At the remote or receive end the single mode fiber is connected to the input of an optical polarimeter 3. This polarimeter measures the SOP of the monitored light. The output of this polarimeter is connected to a processor unit 4; such as, but not limited to, a microcomputer. Handling of the fiber cable causes a local mechanical disturbance to the fiber. This mechanical disturbance, while not introducing detectable macro or micro bending losses, causes the polarization orientation to change. This is detected by the polarimeter and reported to the processor.

Figure 2:
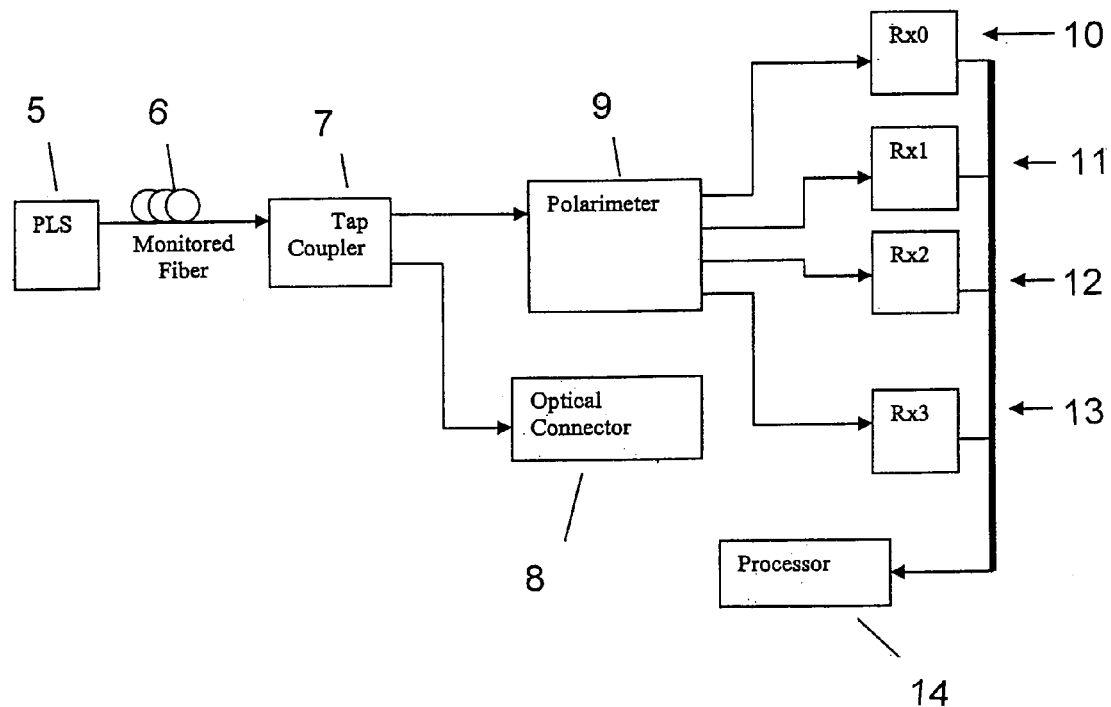
FIG. 2 is a variation on FIG. 1 above with the following distinctions: the polarimeter block is detailed as a full polarimeter with four receivers detecting signals for a Jones Matrix of Stokes Parameters, and the addition of a 2:1 fiber optic coupler and an additional receiver for monitoring the non-intrusion signal.

A more comprehensive view is now described in conjunction with FIG. 2. Optical signal feeds the polarimeter 9, which converts it to the four so-called Stokes Parameters: S0, S1, S2, and S3 as detected by receivers Rx0–Rx3 10, 11, 12, and 13. These parameters collectively describe all possible states of polarization and degrees of polarization (DOP) (Hernday 1998). This is forwarded to the processor 14 where the SOP and DOP are calculated, and the signal is filtered to eliminate normal environmental background noise. The filtered signal is then analyzed for transient signatures and level changes that are characteristic of cable and fiber handling. At a pre-set detection condition the circuit activates the alarm response.

The optical signal can be split by an optional optical coupler 7. The main portion of the signal can be brought back out to an optical connector (8) and be made available for the communication or data receiver, sending a sample to the polarimeter for monitoring. Additionally, the S0 parameter of the polarimeter directly measures optical power without polarization effects. This can be used to monitor the received power for perturbations which are detectable in the non-polarization domain.

Figure 3:
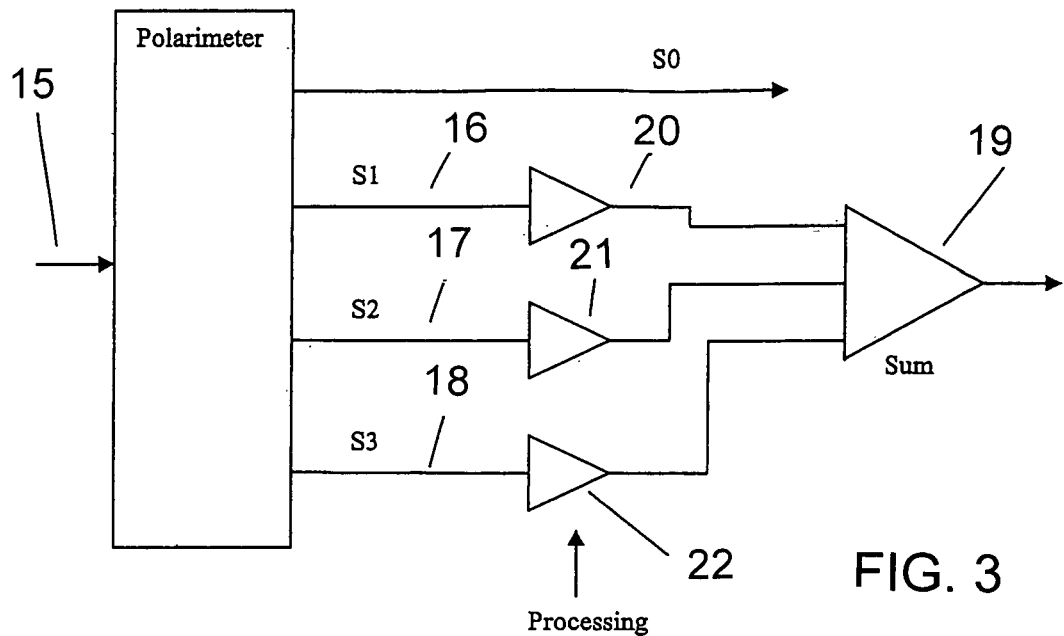
FIG. 3 is a block diagram of a simplified polarimeter intrusion detection system. The output of the individual polarimeter sections of the optics are summed in order to detect changes rather than absolute polarization measurements.

A simplified embodiment is depicted in FIG. 3. In an intrusion detection system, actual SOP is not required as information, only the change in that state. Such an instrument as shown.

Rather than use extensive DSP to calculate DOP, orientation, and angle, a system is presented here for pragmatically determining polarization changes only.

The outputs from a polarimeter 15 are individually monitored in addition to being sent to processors such 20, 21, 22 as differentiators and precision full wave rectifiers (absolute value circuits). These three rectified lines are then summed in a summing amp 19, the output of which is monitored.

Whenever any change in polarization properties occurs, the distribution of power between the polarimeter outputs (which we will refer to as s1, s2, and s3 16, 17, 18) which lead to the calculation of Stokes Parameters S1, S2, and S3 changes; as one increases, it is at the expense of one or both of the others decreasing. If all three lines are differentiated and full wave rectified by the processors 20, 21, 22, the increase on one line will appear as a positive signal into the summing amp, as will the decreases on the other two lines. This is further illustrated in FIG. 7. This additive action increases sensitivity of the system, always positive going and of level representative of the disturbance of the intrusion. Also, by monitoring both S0 and the three non-processed lines s1, s2, and s3, disturbances not related to intrusion, such as a shift in laser power, could be recognized and processed. One possible way to analyze that condition would be, when the S0 changes, to confirm that the ratio of the s1–s3 remains the same (its polarization "signature") and confirm that total power changes the same degree as S0.

Alternatively, processors 20, 21, 22 can convert the s parameters to Stokes Parameters S. Summing the three processed S parameters of S1, S2, and S3 and monitoring the summed level gives an indication of polarization shifting indicating a possible intrusion.

The differentiation and precision rectification can be performed in software if desired.

Figure 4:
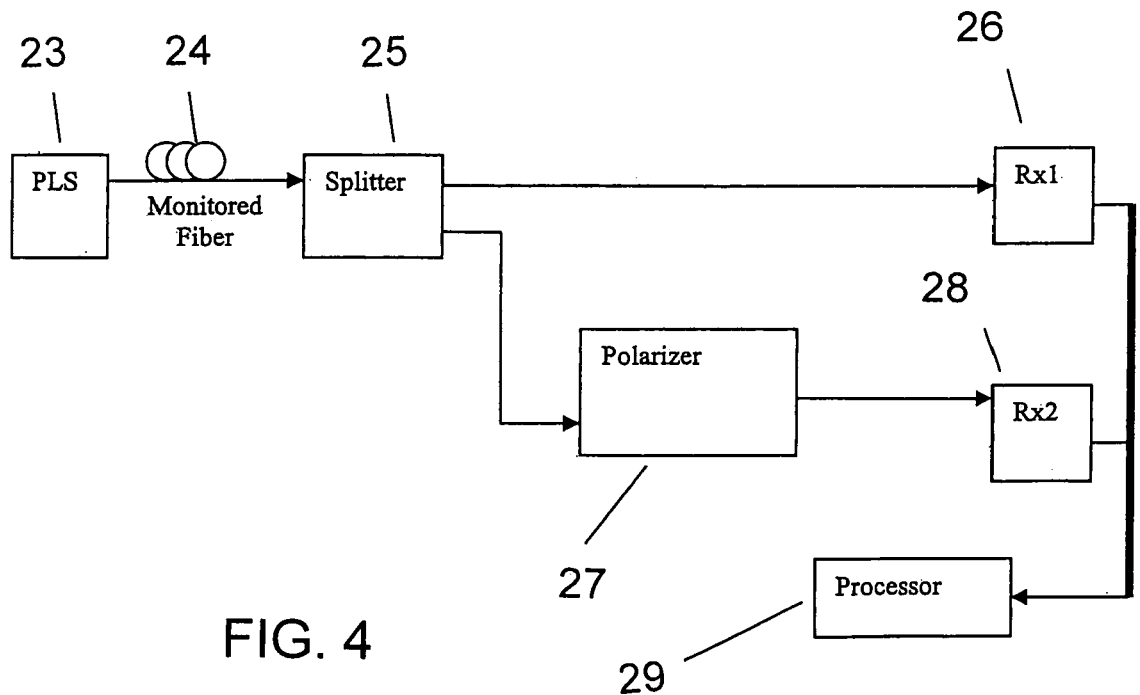
FIG. 4 is a block diagram of a Greatly Simplified SM IDS using a single polarizer to detect change in SOP.

The embodiment in FIG. 4 is for a limited implementation of a polarimeter. This device will detect light that is fully or partially linear polarized. Ease of manufacture and low cost are among the advantages, inability to detect light with circular polarization is a disadvantage. As before, light is injected by a polarized light source 23 into the fiber under test 24. This delivers light into a splitter 25 that directs a portion of the light unaltered to a detector/receiver 26, and the other portion passes through a polarization filter such as a linear polarizer 27 and into a receiver/detector 28. The advantage of this embodiment is that a mixture of polarization sensitive and insensitive signals are combined. By adjusting the relative intensities, as with series resistors on the detectors, or amplifiers of differing gain, the system sensitivity can be optimized for the application.

The signals from the two are monitored and compared by a processor 29. Variations in light amplitude which are not related to an intrusion, and therefor a shift in SOP, will appear on Rx1 26. Shifts in SOP will be detected by Rx2 28. The inability to detect non-linear SOP is not as significant as might first seem because cable handling causes dramatic changes in SOP, with frequent motion between circular, elliptical, and linear states.

Figure 5:
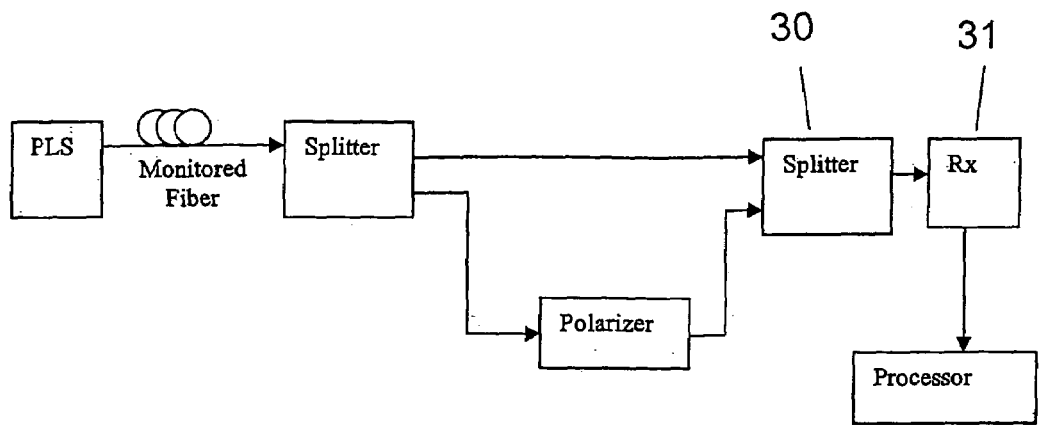
FIG. 5 is a block diagram of a Single Receiver SM IDS uses a secondary coupler to rejoin the multiple light paths into one detector/receiver.

The embodiment in FIG. 5 is a variation on this: the two optical signals, rather than feeding dual detectors, are joined in a coupler 30 and feed a single receiver/detector 31. A significant advantage with this arrangement is a simple one detector feeding the analysis system. The ratio of polarization sensitive to polarization insensitive can be adjusted by varying the split ratios of the two couplers 25 and 30. This allows significant attenuation monitoring with slight polarization sensitivity, strong polarization sensitivity with slight attenuation sensitivity, and every combination in between.

Figure 6:
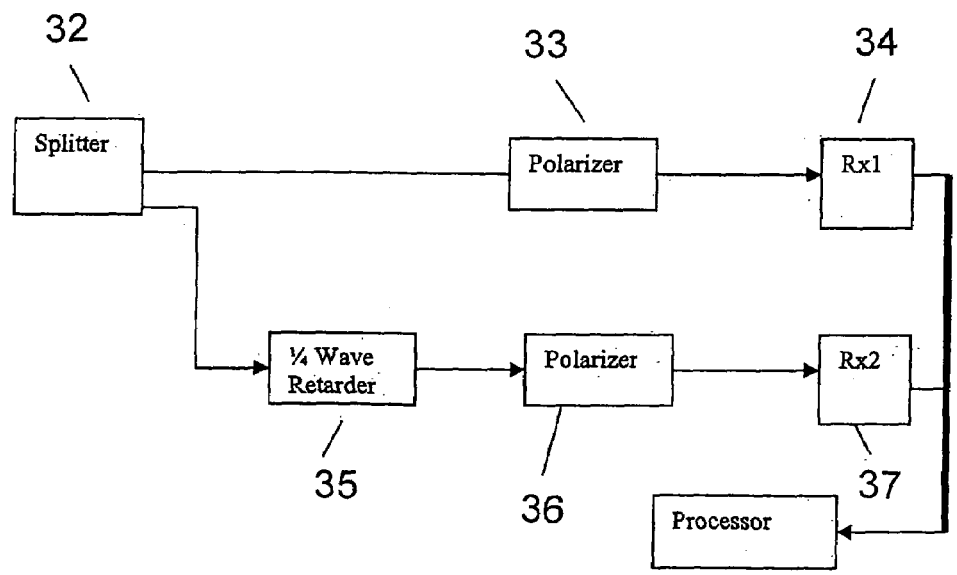
FIG. 6 is a block diagram of a Simplified Polarimeter using one linear polarizer for detection of linearly polarized light, and one ¼ wave retarder feeding a linear polarizer for detection of circularly polarized light.

The embodiment in FIG. 6 will detect both linear and circular polarized light. Light is split by a coupler or splitter 32. One leg feeds a linear polarizer 33, which allows the receiver/detector to detect linear polarized light. The light exiting the other leg of the splitter feeds a ¼ wave retarder 35 which, as in a full polarizer, converts circular polarized light to linear polarized and vice versa. This feeds linear polarizer 36, which allows receiver/detector 37 to detect that which was originally circular polarized light. In operation, it is similar to a full polarimeter, with two primary differences:

1. The lack of the 45-degree offset $2^{nd}$ linear polarizer limits resolution of linear polarized light. This causes a decrease in "intrusion gain" under some conditions.

2. This device does not measure polarization in absolute terms; rather it detects changes in polarization, as such an absolute alignment of the system is not required. This greatly reduces manufacturing costs. Thus the splitter 32 is selected such that it can be manufactured economically. Preferably, the two legs of splitter 32 should be of identical SOP.

Note that couplers do not need to be polarization maintaining because only change in SOP is important, not absolute SOP. This technique can be applied to a full polarimeter design while neglecting calibration and alignment. In these configurations, absolute SOP measurements are inconsequential, only change in SOP is required for IDS.

Figure 7:
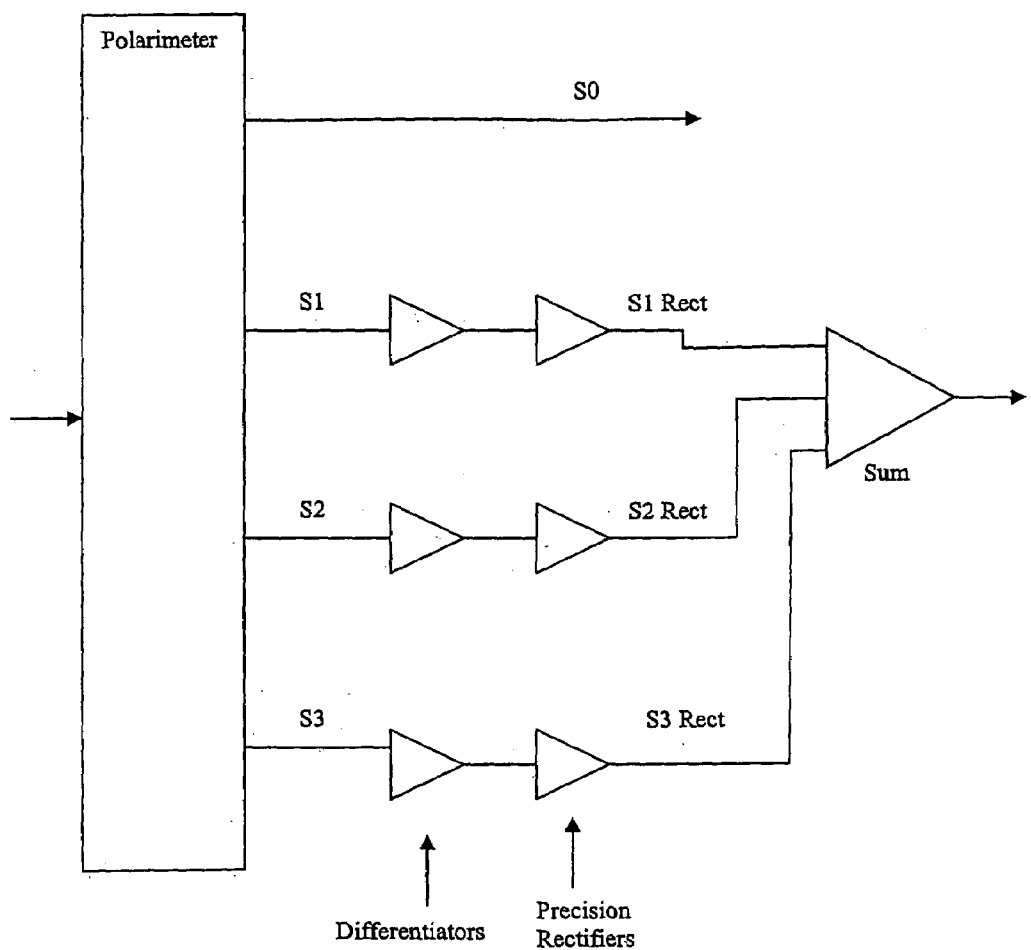
FIG. 7 is a block diagram of a further Simplified Polarimeter.

Rather than use extensive DSP to calculate DOP, orientation, and angle, a system is shown in FIG. 7 for pragmatically determining polarization changes only.

The outputs from S1 through S3 are individually monitored in addition to being sent to differentiators and precision full wave rectifiers (absolute value circuits). These three rectified lines are then summed in a summing amp, the output of which is monitored.

Whenever any change in polarization properties occurs, the distribution of power between S1, S2, and S3 changes; as one increases, it is at the expense of one or both of the others decreasing. If all three lines are differentiated and full wave rectified, the increase on one line will appear as a positive signal into the summing amp, as will the decreases on the other two lines. This additive action increases sensitivity of the system, always positive going and of level representative of the disturbance of the intrusion. Also, by monitoring both S0 and the three non-processed lines S1, S2, and S3, disturbances not related to intrusion, such as a shift in laser power, could be recognized and processed. One possible way to analyze that condition would be, when the S0 changes, to confirm that the ratio of the S1–S3 remains the same (its polarization "signature") and confirm that total power changes the same degree as S0. Because of the hardware rectification, this analysis would be approximate. In implementations which do not first rectify the signal, the above process can be performed.

The differentiation and precision rectification can be performed in software if desired.

Turning now to the locating system shown in FIGS. 8 to 14, the arrangement shown and described herein use the techniques described above.

Fundamental to the invention is the mechanics, or more simply by launching polarized light pulses from a light source 51 into an optical splitter or coupler 52. The output of the coupler is attached to the monitored fiber 54. Optical reflections caused by Rayleigh Backscattering and Fresnel Reflections from the fiber pass through splitter 52 and are fed into a polarization sensitive receiver 53. The signal is then processed by the processor 55: such as, but not limited to, an A/D connected to a microprocessor.

Handling of the fiber cable causes a local mechanical disturbance to the fiber. This mechanical disturbance, while not introducing detectable macro or micro bending losses, causes the polarization orientation to change. This is detected by the polarimeter and reported to the processor. A more comprehensive view is now described.

The optical signal feeds the polarimeter 56, which converts it to the four so-called Stokes Parameters: S0, S1, S2, and S3 as detected by receivers Rx0–Rx3 57, 58, 59, and 60. These parameters collectively describe all possible states of polarization and degrees of polarization (DOP) (Hernday 1998). This is forwarded to the processor 61 where the SOP and DOP are calculated, and the signal is filtered to eliminate normal environmental background noise. The filtered signal is then analyzed for transient signatures and level changes that are characteristic of cable and fiber handling. At a pre-set disturbance level or slope change the circuit activates the alarm response.

Present art consists of the Polarization OTDR as described by Anderson and Bell (1997), which presented a characterization of the static polarization condition of the light as a function of distance. It did not address intrusion, and was only intended to measure a fundamental characteristic of the light within a fiber.

The invention described in this document builds upon the Polarization OTDR by analyzing dynamic distribution of SOP throughout a fiber as an intrusion detection system. It is intended for characterizing transient SOP behavior, which was not addressed at all in prior art.

It is possible to use a single set of detection optics and electronics when configuring a full or partial polarimeter for applications including, but not limited to, intrusion detection in optical fiber.

In the first configuration shown in FIG. 10, an optical switch 71, of the simplified type described hereinbefore, selects between direct measurement on line 72, measurement of circular polarized light on line 73, and measurement of linear polarized light on line 74. This allows one to time division multiplex (TDM) the data, using a further optical switch 75 scanning a fiber under test (FUT). This design allows the use of a 1×3 coupler/splitter rather than switch; potentially offering a cost advantage, although with the disadvantage of several dB of insertion loss in the coupler/splitter. It is critical that either 71 or 76, or both, be a switch as two couplers will not allow TDM. Since intrusions tend to be very slow occurrences, on the order of hundreds of milliseconds, there is ample time to average readings under each measurement state.

A second configuration exists in FIG. 11, which can be chosen for cost as well as other reasons. Significant to the design is the use of a time division switch 77 to route the signal first to a quarter wave retarder 78 and then to the linear polarizer 79, which would remove the need for two linear polarizers. This is because the circular polarizer consists of a quarter wave retarder followed by a linear polarizer. This design also allows the use of a 1×2 coupler/splitter 80 rather than switch, potentially offering a cost advantage, although with the disadvantage of several dB of insertion loss in the coupler/splitter.

The truth table for this configuration follows:

| | | |
|---|---|---|
| S0 | I→A | a→1 |
| S1 | I→B | b→1 |
| S2 | I→C, II→B | b→1 |

One technique for minimizing/streamlining this is to collect and store distance data in a register 81 or other similar device such as, but not limited to, a FIFO; but to only analyze the quasi-CW signal from the Fresnel reflections in real time. This "quasi-CW" signal is comprised of the Fresnel reflections from the trace with a minor Rayleigh scattering component. These Fresnel reflections, on the order of 20–25 dB above the scattering are high in amplitude but low in duty cycle. They can be integrated along with the scattering, or captured by peak detecting sample and hold (or other technique). This quasi-CW signal is analyzed for an intrusion. When one is detected, the time dependant data in the register 81 is analyzed for location information.

The processing required for signal analysis of an intrusion detection system is not insignificant, algorithms which analyze the environment and filter out disturbances to be ignored are highly computationally intensive. When configuring a locating IDS, the task becomes much more complex. The signal analysis normally used for non-locating might need to be applied to every location in time along the vertical axis of the imaginary OTDR trace, perhaps 2000 locations or more. The CPU burden of applying conventional finite DSP to each of these elements is extreme. Thus the above technique of storing the data in the register until an intrusion event is detected can be used. While the intrusion event can be most effectively detected from the Fresnel reflections, other techniques using the other data such as data corresponding to a specific location in the fiber can be used to detect the intrusion event in real time; and only when the event has been detected is the bulk of the remaining data from the register used for location. The scattering signal level is typically orders of magnitude lower than the Fresnel Reflections and the Fresnel Reflections are typically infrequent so that the reflections are integrated along with the scattering such that the Fresnel Reflections integrate into a manageable signal and the total integrated signal is monitored for indication of fiber manipulation. Also the large Fresnel reflections can be sampled using a storage technique, this stored sample is compared to other dynamic or stored samples and this comparison is monitored for indication of fiber manipulation.

One variation is to add a reflection at the far end of the cable, such as a connector with a gold deposition.

It will be appreciated that the monitoring system can be used with dark fiber either which are available as spare fibers or which are specifically dedicated as monitoring fibers. However in other cases, the monitoring system can be used with active fibers carrying data. In this case, if the monitor is to be used concurrently with data, a wavelength selective reflection can be used at the remote end to increase and/or control the intensity of the Fresnel reflections, such as a printed Bragg Grating 90, a wave length division multiplexer (WDM) 91 and a reflective connector 92, or a WDM 93 and fiber loop back 94, as shown in FIGS. 12, 13 and 14 respectively.

Turning now to the third set of embodiments shown in FIGS. 15 to 20, the arrangements are similar to those shown and described above and use many of the same techniques. Thus it will be appreciated that each of the techniques described can be used symmetrically. In addition, in the arrangement shown in FIGS. 15 to 20, the detections system is located at the remote end from the signal transmission in a non-locating mode similar to that of FIGS. 1 to 7. However, symmetrically to that of FIGS. 8 to 14 the detection system can be located at the same end as the transmission for a locating arrangement responsive to reflected and backscattered light and may use the same techniques as described.

Thus as shown the arrangement includes a transmitter launching a light source of stable polarization 101 into a single mode fiber 102. At the remote or receive end the single mode fiber is connected to the input of an optical polarizer 103. This polarizer passes light with similarly aligned polarization, and blocks light orthogonally aligned. The output of this polarizer is connected to an optical receiver 104. Handling of the fiber cable causes a local mechanical disturbance to the fiber. This mechanical disturbance, while not introducing detectable macro or micro bending losses, causes the polarization orientation to change. This results in a change in the optical power at the output port 105 which feeds the receiver. The resultant optical signal is proportional in amplitude to the disturbing forces.

In the case of active fiber monitoring, where live traffic is carried on the monitored fiber, as shown in FIG. 16, the optical signal from the source 106 is split by an optical coupler 107. The main portion of the signal can be brought back out to an optical connector 108 and be made available for the communication or data receiver. The sampled output 109 feeds the polarizer 110, which feeds the receiver 111. The signal can be digitized and forwarded to the processor 112 where the signal is filtered to eliminate normal environmental background noise. The filtered signal is then analyzed for transient signatures and level changes that are characteristic of cable and fiber handling. At a pre-set disturbance level the circuit activates the alarm response.

An enhanced variation of the detection scheme is shown in FIG. 17. The incoming optical signal from the fiber 113 is connected to the input of a 2×1 coupler 114 where a portion of the light is sampled. One output of the coupler 115 is then connected to the input port of a polarizer 116 as above. The coupler maintains polarization information and it is used to sample a portion of the total optical signal. The other output of the coupler 117 is connected to a second receiver 118 where the absolute throughput power is calculated from the fixed ratio sample. This establishes an absolute power baseline that is compared to the polarization detection sampling. The processor then compares the response in the two channels and is able to calculate any power change as well as changes in polarization. This comparison can be performed in the digital domain including use of equipment such as, but not limited to a computer, or the analog domain using circuitry such as, but not limited to, a differential amplifier. This provides more information on fiber disturbances as a significant change in both channels could indicate a problem with the laser or fiber path while a transient and steady state change in the polarization only would provide a strong indication of an intrusion attempt.

The techniques described above can be combined, as illustrated in FIG. 18. The tap coupler of FIG. 16 and the dual receiver of FIG. 17 are implemented.

In FIGS. 15, 16, 17, and 18, the polarizer 103, 110, and 116 can be replaced by a polarization controlling device 120, as shown in FIG. 19. Under feedback control, the base polarization state can be adjusted to any level within the extinction ratio of the polarizer to optimize the efficiency and sensitivity of the measurement.

An embodiment shown in FIG. 20 consists of launching a light source of stable polarization 121 into a single mode fiber 122. At the remote or receive end the single mode fiber is connected to the input of an optical splitter or coupler 123, typically of a non-symmetrical split ratio. One output of this coupler, typically the larger coupling percentage leg, feeds the optical connector 124 to the end receiver. The other leg of coupler feeds an optical splitter or coupler 125. Typically this would be a 50:50 coupler. One leg of this coupler feeds an optical receiver 126. The other coupler leg feeds a polarization controller 127, which alters the state of polarization (SOP) of the exiting light. This feeds the input to an optical coupler or splitter 128, typically of a 50:50 split ratio. The two output legs of this coupler feeds a pair of optical polarizers 129 and 130, whose SOP is aligned orthogonal to each other. These feed a pair of optical receivers 131 and 132. A processor/controller 133, such as a combination of A/D converters and CPU monitors the outputs of the three receivers 126, 131, and 132, and adjusts the controller 27 accordingly.

In order to maximize detection sensitivity, or "intrusion gain", the optics must be aligned such that the signal at Rx3 132 is at a minimum; i.e. Pol 2 130 perfectly orthogonal to the light. This signal is, however, very low in magnitude and difficult to measure. One way of insuring this alignment is to align Polarization Controller 127 for a maximum signal at Rx2 131.

The polarization controller 127 is a device that can convert any SOP into any other SOP. Using this, a transmitter laser can be easily converted into a more readily managed linear polarization. The Processor 133 adjusts SOP by monitoring Rx2 131 for a maximum signal. When this occurs, the SOP is properly aligned and linear. Rx3 132 then monitors for intrusions.

Additionally, the ratio of signals at Rx2 131 to Rx1 126 is an indication of the "tuning" of polarization alignment. When Rx2 drops in power while Rx1 remains constant, alignment issues or an intrusion are occurring. If they both change in power, an attenuation event is occurring, such as laser power fluctuation or a failing connector.

Thus in FIG. 20 a polarized light source launched into a length of single mode fiber. The single mode fiber is connected to the optical coupler which splits the signal: the majority going to the system data receiver (if an active fiber unit), a portion sampled to the measurement system. This sampled portion goes to another splitter, one leg of which monitors power, the other leg is monitored for intrusion. This intrusion leg feeds a polarization controller, which both takes whatever stable SOP of the light and converts it to linearly polarized, and aligns it with the orientation of polarimeter Pol 1. Pol 1 feeds Rx2 and allows a strong signal for both closing the control loop on the polarization controller, as well as monitoring, with Rx1, fluctuations in absolute (non-intrusion dependant) power. Pol 2 feeds Rx3; and, being aligned perpendicular to the SOP of the light, is optimized for intrusion sensitivity.

In summation: Rx1 measures absolute optical power, Rx2 monitors maximum polarized power, and Rx3 monitors intrusion. The combination of Rx1 and Rx2 monitor systematic stabilities not related to intrusion. The combination Rx1 and Rx3 detect actual intrusions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

We claim:

1. A method for detecting and locating movement of an optical fiber comprising:

providing an optical fiber having first and second ends;

injecting polarized light into the first end of the optical fiber in a series of sequential pulses such that, in response to each pulse, there is returned to the first end of the fiber a light signal which includes Rayleigh backscattering components generated from positions along the fiber so that each light signal forms a trace which varies over time depending on the position along the fiber from which the light is returned;

detecting the received light signals at the first end;

comparing a part only of each received light signal, which is responsive to a pulse, relative to data obtained from previously received light signals responsive to previous ones of the pulses to detect changes of polarization of the part only of the received light signal relative to the corresponding parts of the previously received light signals from said previous ones of the pulses;

detecting movement of a portion of the fiber along the length thereof by analyzing the changes in polarization of the part only of the received light signal to determine any changes which are indicative of movement of the optical fiber at a portion thereof along the length thereof;

the part only of the received light signal which is analyzed to detect movement including light returned from the second end of the fiber;

generating an alarm in response to the detection of any such changes;

detecting, in discrete time steps, polarization of the Raleigh backscattering components of each light signal to generate, for each time step, data relating to the polarization of the Rayleigh backscattering components in that time step;

storing the data relating to the polarization of the Rayleigh backscattering components in said discrete time steps in a register for a period of time and discarding the data relating to the polarization of the Rayleigh backscattering components after the period of time and replacing it with fresh data;

such that the stored data relating to the polarization of the Rayleigh backscattering components in said discrete time steps is time dependent and thus indicative of a time of travel of the light signals and thus of a location of the position from which the Rayleigh backscattering components have originated along the fiber;

and, only in the event that movement is detected of the optical fiber by analyzing the changes in polarization of the part only of the received light signal, extracting the data relating to the polarization of the Rayleigh backscattering components in said discrete time steps from the register and analyzing the polarization of the Rayleigh backscattering components in said discrete time steps to detect the location of the movement.

2. The method according to claim 1 wherein the register is a FIFO.

3. The method according to claim 1 wherein the part only of the received light signals includes light signals returned from the second end of the fiber.

4. The method according to claim 1 wherein the changes in polarization are detected by splitting the received light signals into at least first and second paths and using the first path to detect an amplitude of the light in the path when linearly polarized and using the second path to detect an amplitude of the light in the path when circularly polarized.

5. The method according to claim 4 wherein the circularly polarized light in the second path is isolated by a quarter wave retarder and a linear polarizer.

6. The method according to claim 4 wherein the light signals are split into the separate paths by a splitter.

7. The method according to claim 4 wherein the splitter is selected such that the state of polarization (SOP) of the signals in the separate paths are NOT necessarily maintained relative to an absolute reference as would be required in a standard polarimeter.

8. The method according to claim 4 wherein the light signals are split into the separate paths by an optical switch which separates the signals in time division such that the paths are selected sequentially.

9. The method according to claim 8 wherein there is provided a second optical switch or a coupler for supplying the signals from the separate paths to a single receiving system for analyzing the amplitude.

10. The method according to claim 8 wherein the light in the second path is circularly polarized by a quarter wave retarder and a linear polarizer and wherein the second path is fed back to the optical switch so as to use a single linear polarizer for both the first and second paths.

11. The method according to claim 4 wherein an absolute value is obtained of the change in amplitude in each path between a signal and previous signals and the absolute values are summed together to provide an output for analysis.

12. The method according to claim 1 wherein the changes in polarization are detected by splitting the received light signals into only first and second and third paths and using the first path to detect an amplitude of the light in the path when linearly polarized and using the second path to detect an amplitude of the light in the path when circularly polarized and using the third path to detect an amplitude of the light in the path when un-polarized.

13. The method according to claim 12 wherein an absolute value is obtained of the change in amplitude in each path between a signal and previous signals and the absolute values are summed together to provide an output for analysis.

14. The method according to claim 1 wherein the changes in polarization are detected by splitting the received light signals into only first and second paths and using the first path to detect an amplitude of the light in the path when linearly polarized and using the second path to detect an amplitude of the light in the path when circularly polarized.

15. The method according to claim 14 wherein an absolute value is obtained of the change in amplitude in each path between a signal and previous signals and the absolute values are summed together to provide an output for analysis.

16. The method according to claim 1 wherein the optical fiber is a telecommunications optical fiber including providing for the optical fiber a transmitter of optical pulses at the transmit end and a receiver of the transmitted optical pulses at the receive end such that data can be transmitted along the fiber in a telecommunications system; and wherein the method includes the step of securing the fiber against intrusion by detecting manipulation of the optical fiber causing said movement of a portion thereof along the length thereof and by detecting said movement.

17. A method for detecting and locating movement of an optical fiber comprising:

providing an optical fiber having first and second ends;

injecting polarized light into the first end of the optical fiber in a series of sequential pulses such that, in response to each pulse, there is returned to the first end of the fiber a light signal;

each light signal including light returned from the second end which is reflected and including Rayleigh backscattering components generated from positions along the fiber, so that each light signal forms a trace which varies over time depending on the position along the fiber from which the light is returned;

detecting the received light signals at the first end;

comparing a part only of each received light signal, which is responsive to a pulse, relative to data obtained from previously received light signals responsive to previous ones of the pulses to detect changes of polarization of the part only of the received light signal relative to the corresponding parts of the previously received light signals from said previous ones of the pulses;

detecting movement of a portion of the fiber along the length thereof by analyzing the changes in polarization of the part only of the received light signal to determine any changes which are indicative of movement of the optical fiber at a portion thereof along the length thereof;

the part only of the received light signal which is analyzed to detect movement including said reflected light returned from the second end of the fiber;

generating an alarm in response to the detection of any such changes;

detecting, in discrete time steps, polarization of the Rayleigh backscattering components of each light signal to generate, for each time step, data relating to the polarization of the Rayleigh backscattering components in that time step;

storing the data relating to the polarization of the Rayleigh backscattering components in said discrete time steps in a register for a period of time and discarding the data relating to the polarization of the Rayleigh backscattering components after the period of time and replacing it with fresh data;

such that the stored data relating to the polarization of the Rayleigh backscattering components in said discrete time steps is time dependent and thus indicative of a time of travel of the light signals and thus of a location of the position from which the Rayleigh backscattering components have originated along the fiber;

and, only in the event that movement is detected of the optical fiber by analyzing the changes in polarization of the part only of the received light signal, extracting the data relating to the polarization of the Rayleigh backscattering components in said discrete time steps from the register and analyzing the polarization of the Rayleigh backscattering components in said discrete time steps to detect the location of the movement.

18. The method according to claim 17 wherein where the backscattering components have a level which is typically orders of magnitude lower than the reflected light and the reflected light is typically infrequent, and wherein the reflected light is integrated such that the reflected light integrate into a manageable signal and the total integrated signal is monitored for indication of fiber manipulation.

19. The method according to claim 17 wherein the backscattering components have a level which is typically orders of magnitude lower than the reflected light and the reflected light is typically infrequent and wherein the reflected light is sampled using a storage technique, this stored sample is compared to other dynamic or stored samples and this comparison is monitored for indication of fiber manipulation.

20. The method according to claim 17 wherein the reflected light is from Fresnel reflections.

* * * * *